US010572586B2

(12) United States Patent
Nagano et al.

(10) Patent No.: US 10,572,586 B2
(45) Date of Patent: Feb. 25, 2020

(54) TECHNIQUE FOR AUTOMATICALLY SPLITTING WORDS

(71) Applicant: INTERNATIONAL BUSINESS MACHINES CORPORATION, Armonk, NY (US)

(72) Inventors: Toru Nagano, Tokyo (JP); Nobuyasu Itoh, Kanagawa (JP); Gakuto Kurata, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/906,525

(22) Filed: Feb. 27, 2018

(65) Prior Publication Data
US 2019/0266239 A1 Aug. 29, 2019

(51) Int. Cl.
*G06F 17/00* (2019.01)
*G06F 17/27* (2006.01)

(52) U.S. Cl.
CPC ........ *G06F 17/2735* (2013.01); *G06F 17/278* (2013.01)

(58) Field of Classification Search
CPC .. G06F 17/2223; G06F 17/2735; G06F 17/22; G06F 17/278; G06F 7/00; G06F 17/00; G06F 17/27; G10L 15/06
USPC ............ 348/222.1; 434/167; 704/1, 2, 9, 10, 704/231, 246, 249, 251, 258, 277, 7, 8, 704/235, 243, 244, 250, 252, 254, 255, 704/257, 260, 270.1; 705/5; 707/749, 707/772, 812, 730, 741; 715/236, 257, 715/259, 256, 830; 375/240.26; 706/12; 714/773
See application file for complete search history.

(56) References Cited

U.S. PATENT DOCUMENTS

| | | | | |
|---|---|---|---|---|
| 4,747,053 A | * | 5/1988 | Yoshimura | G06F 17/2735 715/236 |
| 5,303,150 A | * | 4/1994 | Kameda | G06F 17/276 704/9 |
| 5,655,129 A | * | 8/1997 | Ito | G06F 16/322 704/10 |
| 5,835,888 A | * | 11/1998 | Kanevsky | G10L 15/18 704/9 |
| 5,873,056 A | * | 2/1999 | Liddy | G06F 17/274 704/9 |
| 6,243,680 B1 | * | 6/2001 | Gupta | G10L 15/06 704/258 |
| 6,304,841 B1 | * | 10/2001 | Berger | G06F 17/277 704/2 |
| 6,345,245 B1 | * | 2/2002 | Sugiyama | G06F 17/2735 704/10 |

(Continued)

*Primary Examiner* — Gerald Gauthier
(74) *Attorney, Agent, or Firm* — Tutunjian & Bitetto, P.C.

(57) ABSTRACT

A computer-implemented method, computer program product, and system are provided for separating a word in a dictionary. The method includes reading a word from the dictionary as a source word. The method also includes searching the dictionary for another word having a substring with a same surface string and a same reading as the source word. The method additionally includes splitting the another word by the source word to obtain one or more remaining substrings of the another word. The method further includes registering each of the one or more remaining substrings as a new word in the dictionary.

20 Claims, 9 Drawing Sheets

(56) References Cited

U.S. PATENT DOCUMENTS

| | | | |
|---|---|---|---|
| 6,393,389 B1* | 5/2002 | Chanod | G06F 17/271 704/4 |
| 6,393,444 B1* | 5/2002 | Lawrence | G06F 17/273 715/257 |
| 6,530,058 B1* | 3/2003 | Visconti | G06F 11/1072 714/773 |
| 6,556,973 B1* | 4/2003 | Lewin | G06F 17/271 704/275 |
| 6,732,074 B1* | 5/2004 | Kuroda | G10L 15/063 704/244 |
| 7,120,582 B1* | 10/2006 | Young | G10L 15/063 704/255 |
| 7,236,923 B1* | 6/2007 | Gupta | G06F 17/277 704/7 |
| 7,505,903 B2* | 3/2009 | Yamamoto | G06F 17/272 704/231 |
| 7,558,725 B2* | 7/2009 | Greenwald | G06F 17/273 704/1 |
| 8,060,368 B2* | 11/2011 | Osawa | 704/10 |
| 8,515,969 B2* | 8/2013 | Nicks | G06F 17/2705 704/10 |
| 2001/0037200 A1* | 11/2001 | Ogawa | G10L 17/02 704/246 |
| 2003/0048852 A1* | 3/2003 | Hwang | H04L 1/0041 375/240.26 |
| 2003/0135361 A1* | 7/2003 | Glushnev | G06F 17/271 704/10 |
| 2003/0229497 A1* | 12/2003 | Wilson | G09B 5/04 704/270.1 |
| 2003/0233235 A1* | 12/2003 | Park | G06F 17/2755 704/257 |
| 2004/0015356 A1* | 1/2004 | Nakamura | G10L 15/063 704/250 |
| 2004/0205671 A1* | 10/2004 | Sukehiro | G06F 17/2735 715/259 |
| 2005/0027513 A1* | 2/2005 | Kanno | G06F 17/2735 704/10 |
| 2005/0209854 A1* | 9/2005 | Abrego | G10L 15/187 704/252 |
| 2005/0228639 A1* | 10/2005 | Abe | G06F 17/2735 704/7 |
| 2005/0246365 A1* | 11/2005 | Lowles | G06F 1/1626 |
| 2006/0031070 A1* | 2/2006 | Abrego | G10L 15/063 704/243 |
| 2006/0058996 A1 | 3/2006 | Barker | |
| 2006/0149557 A1* | 7/2006 | Kaneko | G06F 17/273 704/277 |
| 2006/0242191 A1* | 10/2006 | Kutsumi | G06F 17/2735 |
| 2007/0055496 A1* | 3/2007 | Seto | G06F 17/277 704/9 |
| 2007/0260451 A1* | 11/2007 | Yanagisawa | G06F 17/2735 704/10 |
| 2008/0120093 A1* | 5/2008 | Izumida | G06F 17/2735 704/10 |
| 2008/0221866 A1* | 9/2008 | Katragadda | G06F 17/2223 704/8 |
| 2008/0281597 A1* | 11/2008 | Suzuki | A63F 13/04 704/258 |
| 2008/0312910 A1* | 12/2008 | Zhang | G06F 17/2735 704/10 |
| 2008/0312911 A1* | 12/2008 | Zhang | G06F 17/2735 704/10 |
| 2008/0319736 A1* | 12/2008 | Toutanova | G06F 17/2818 704/9 |
| 2009/0044105 A1* | 2/2009 | Matsukawa | G06F 17/2735 715/256 |
| 2009/0055168 A1* | 2/2009 | Wu | G06F 17/2223 704/10 |
| 2009/0228276 A1* | 9/2009 | Osawa | 704/246 |
| 2010/0010813 A1* | 1/2010 | Harada | G10L 15/08 704/249 |
| 2010/0114884 A1* | 5/2010 | Tsuzuki | H04N 5/44543 707/730 |
| 2011/0104646 A1* | 5/2011 | Harte | G09B 19/04 434/167 |
| 2011/0106523 A1* | 5/2011 | Maeda | G06F 17/2223 704/2 |
| 2011/0252062 A1* | 10/2011 | Hanatani | G06F 16/907 707/772 |
| 2012/0226491 A1* | 9/2012 | Yamazaki | G10L 15/06 704/8 |
| 2012/0254802 A1* | 10/2012 | Tinkler | G06F 17/2735 715/830 |
| 2012/0274803 A1* | 11/2012 | Nako | G06K 9/228 348/222.1 |
| 2013/0090919 A1* | 4/2013 | Nakano | G06F 17/2735 704/9 |
| 2013/0096918 A1* | 4/2013 | Harada | G10L 15/19 704/251 |
| 2013/0124439 A1* | 5/2013 | Yamamoto | G06F 17/278 706/12 |
| 2013/0231922 A1* | 9/2013 | Park | G06F 17/2735 704/9 |
| 2013/0275164 A1* | 10/2013 | Gruber | G10L 17/22 705/5 |
| 2014/0207789 A1* | 7/2014 | Lee | G06F 16/90324 707/741 |
| 2014/0358533 A1* | 12/2014 | Kurata | G10L 15/187 704/231 |
| 2015/0012261 A1* | 1/2015 | Walther | G10L 13/08 704/9 |
| 2015/0120788 A1* | 4/2015 | Brun | G06F 16/22 707/812 |
| 2015/0261741 A1* | 9/2015 | Ueda | G06F 17/2223 704/10 |
| 2015/0310854 A1* | 10/2015 | Takemura | G10L 15/22 704/254 |
| 2016/0027437 A1 | 1/2016 | Hong et al. | |
| 2016/0283446 A1* | 9/2016 | Okajima | G06F 17/2223 |
| 2017/0032779 A1 | 2/2017 | Ahn et al. | |
| 2018/0107654 A1* | 4/2018 | Jung | G06F 17/2755 |
| 2018/0122365 A1* | 5/2018 | Kunitake | G10L 15/187 |
| 2019/0013010 A1* | 1/2019 | Kokubo | G10L 15/02 |
| 2019/0266239 A1* | 8/2019 | Nagano | G06F 17/2735 |

\* cited by examiner

| No. | Surface String | Reading |
|---|---|---|
| 1 | 大宮 | o-o-mi-ya |
| 2 | 大宮与野 | o-o-mi-ya-yo-no |
| 3 | 神大宮前 | shi-n-da-i-mi-ya-ma-e |
| ... | ... | ... |

*FIG.2*

| No. | Surface String | Reading |
|---|---|---|
| 1 | 大宮 | o-o-mi-ya |
| 2 | 大宮与野 | o-o-mi-ya-yo-no |
| 3 | 神大宮前 | shi-n-da-i-mi-ya-ma-e |
| 4 | 与野船橋 | yo-no-fu-na-ba-shi |
| 5 | 船橋グリーンハイツ | fu-na-ba-shi-gu-ri-:-n-ha-i-tsu |

FIG.3A

| No. | Surface String | Reading |
|---|---|---|
| 1 | 大宮 | o-o-mi-ya |
| 2 | (大宮)与野 | (o-o-mi-ya)-yo-no |
| 3 | 神(大宮)前 | shi-n-(da-i-mi-ya)-ma-e |
| 4 | 与野船橋 | yo-no-fu-na-ba-shi |
| 5 | 船橋グリーンハイツ | fu-na-ba-shi-gu-ri-:-n-ha-i-tsu |

| No. | Surface String | Reading |
|---|---|---|
| 1 | 大宮 | o-o-mi-ya |
| 2 | 与野 | yo-no |
| 3 | 神大宮前 | shi-n-da-i-mi-ya-ma-e |
| 4 | 与野船橋 | yo-no-fu-na-ba-shi |
| 5 | 船橋グリーンハイツ | fu-na-ba-shi-gu-ri:-n-ha-i-tsu |

FIG.4B

| No. | Surface String | Reading |
|---|---|---|
| 1 | 大宮 | o-o-mi-ya |
| 2 | 与野 | yo-no |
| 3 | 神大宮前 | shi-n-da-i-mi-ya-ma-e |
| 4 | (与野)船橋 | (yo-no)-fu-na-ba-shi |
| 5 | 船橋グリーンハイツ | fu-na-ba-shi-gu-ri:-n-ha-i-tsu |

| No. | Surface String | Reading |
|---|---|---|
| 1 | 大宮 | o-o-mi-ya |
| 2 | 与野 | yo-no |
| 3 | 神大宮前 | shi-n-da-i-mi-ya-ma-e |
| 4 | 船橋 | fu-na-ba-shi |
| 5 | 船橋グリーンハイツ | fu-na-ba-shi-gu-ri:-n-ha-i-tsu |

*FIG.5A*

| No. | Surface String | Reading |
|---|---|---|
| 1 | 大宮 | o-o-mi-ya |
| 2 | 与野 | yo-no |
| 3 | 神大宮前 | shi-n-da-i-mi-ya-ma-e |
| 4 | 船橋 | fu-na-ba-shi |
| 5 | (船橋)グリーンハイツ | (fu-na-ba-shi)-gu-ri:-n-ha-i-tsu |

*FIG.5B*

| No. | Surface String | Reading |
|---|---|---|
| 1 | 大宮 | o-o-mi-ya |
| 2 | 与野 | yo-no |
| 3 | 神大宮前 | shi-n-da-i-mi-ya-ma-e |
| 4 | 船橋 | fu-na-ba-shi |
| 5 | グリーンハイツ | gu-ri:-n-ha-i-tsu |

FIG.6

```
L_next = L
while count_match > 0: #(5)
    L = L_next
    count_match = 0
    for i in range(len(L)): #(4)
        for j in range(len(L)): #(4)
            if i == j:
                continue
            if w[j].c.find(w[i].c) and w[j].p.find(w[i].p): #(2)
                w1, w2, w3 = termsplit(w[i], w[j]) #(3)
                L_next.append( [ w1, w2, w3 ] ) #(4)
                count_match += 1
```

FIG.8

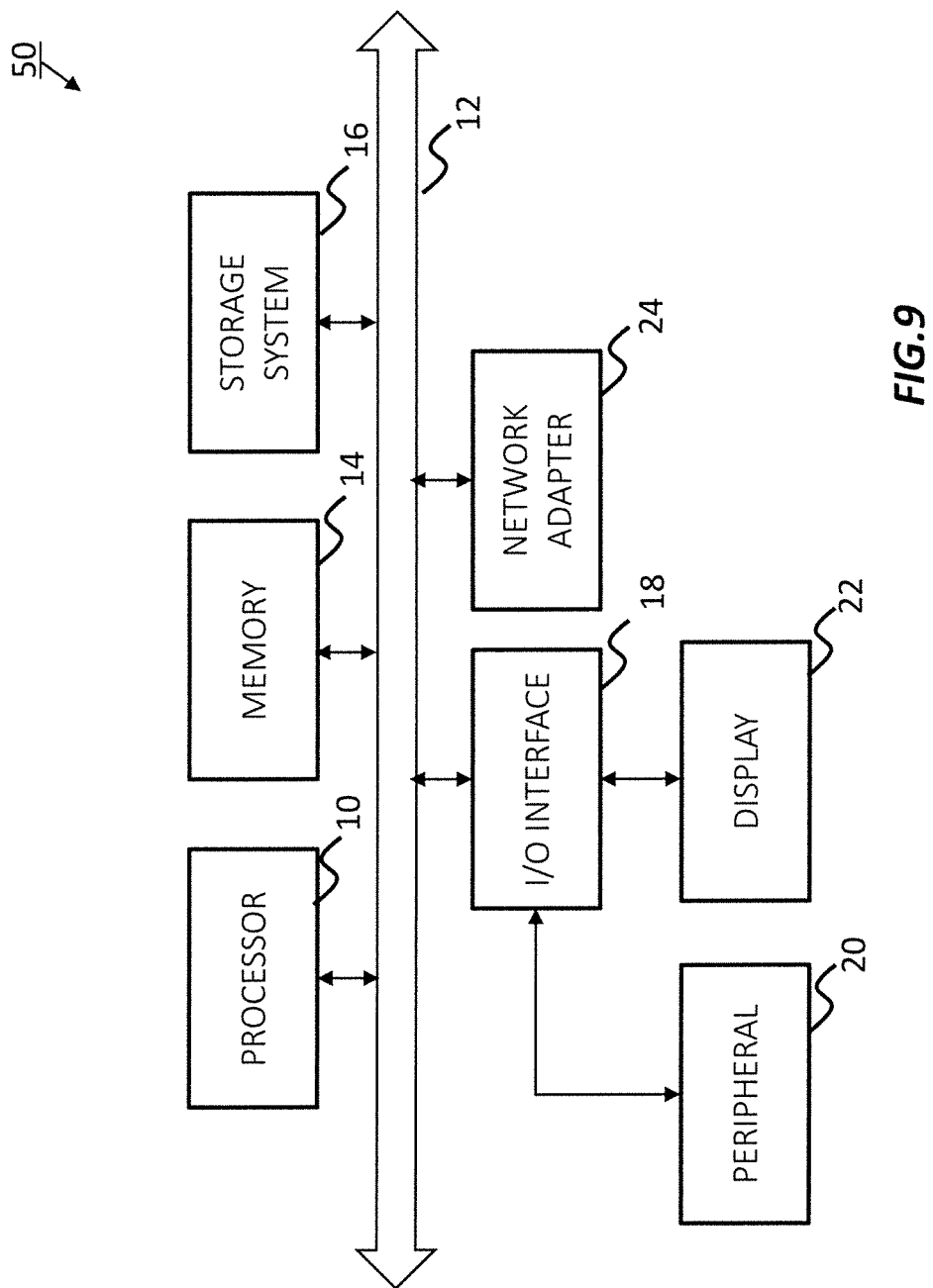

TECHNIQUE FOR AUTOMATICALLY SPLITTING WORDS

BACKGROUND

Technical Field

The present disclosure, generally, relates to a technique for automatically splitting words, more particularly, to a technique for automatically splitting words in a dictionary.

Description of the Related Art

Recognizing store names and branches of a company is one of main applications for speech recognition technology. Many applications, such as location search systems, telephone number lookup systems and navigation systems, require the applications to recognize a lot of names.

In many cases, the lists of the branch and shop are given as a set of a combination of surface strings and it's reading. The speech recognition system is provided with such lists as a dictionary in order to improve accuracy in speech recognition results.

However, stores or branches in such a list often have long names and users don't utter entire names precisely. This means that adding these long names to the dictionary without word segmentation does not improve the accuracy of speech recognition, because the word in the dictionary doesn't match an actual utterance. In a case where a conventional tokenizer is used in order to segment words, the conventional tokenizer is likely to cause over splitting which wastes computational resources.

SUMMARY

According to an embodiment of the present invention, a computer-implemented method is provided for separating a word in a dictionary. The method includes reading a word from the dictionary as a source word. The method also includes searching the dictionary for another word having a substring with a same surface string and a same reading as the source word. The method further includes splitting the other word by the source word to obtain one or more remaining substring of the other word. The method includes further registering each of the one or more remaining substrings as a new word in the dictionary.

Computer systems and computer program products relating to one or more aspects of the present invention are also described and claimed herein.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein:

FIG. 2 shows a part of a dictionary which is a processing object of an updater according to the embodiment of the present invention;

FIG. 3A describes a way of separating words in a dictionary according to the embodiment of the present invention;

FIG. 3B describes a way of separating words in a dictionary according to the embodiment of the present invention;

FIG. 4A describes a way of separating words in a dictionary according to the embodiment of the present invention;

FIG. 4B describes a way of separating words in a dictionary according to the embodiment of the present invention FIG. 5A describes a way of separating words in a dictionary according to the embodiment of the present invention;

FIG. 5B describes a way of separating words in a dictionary according to the embodiment of the present invention;

FIG. 6 describes a way of separating words in a dictionary according to the embodiment of the present invention;

FIG. 8 is an example of program cord according to an embodiment of the present invention; and FIG. 9 depicts a schematic of a computer system according to one or more embodiments of the present invention.

DETAILED DESCRIPTION

Now, the present invention will be described using particular embodiments, and the embodiments described hereafter are understood to be only referred to as examples and are not intended to limit the scope of the present invention.

One or more embodiments according to the present invention are directed to computer-implemented methods, computer systems and computer program products for separating words in a dictionary which can be used for speech recognition.

Referring to the series of FIGS. 1-9, there are shown a computer system and a method for separating words in a dictionary according to exemplary embodiments of the present invention.

As describe above, many applications, such as an operator assistance service at call center and a store guide service each employing speech recognition technology, require the application to recognize a lot of names. For example, there are 17,000 drug stores (as of 2013), 69,977 coffee shops (as of 2014) and 68,756 dental clinics (as of 2015) in Japan.

These stores and clinics often have long name and users don't utter the entire name precisely because of the length. Therefore, even when a list of names including long names is added to a dictionary for a speech recognition system, unless the long names are segmented, the accuracy of speech recognition result does not improve, because the word in the dictionary doesn't match actual utterance.

The present invention provides a technique for automatically splitting words in a dictionary. According to an exemplary embodiment of the present invention, a word in a dictionary may be split by using other word in the dictionary. This technique may apply to languages which have words written without spaces, such as Japanese, Chinese, Korean, and Thai.

Figure 1:
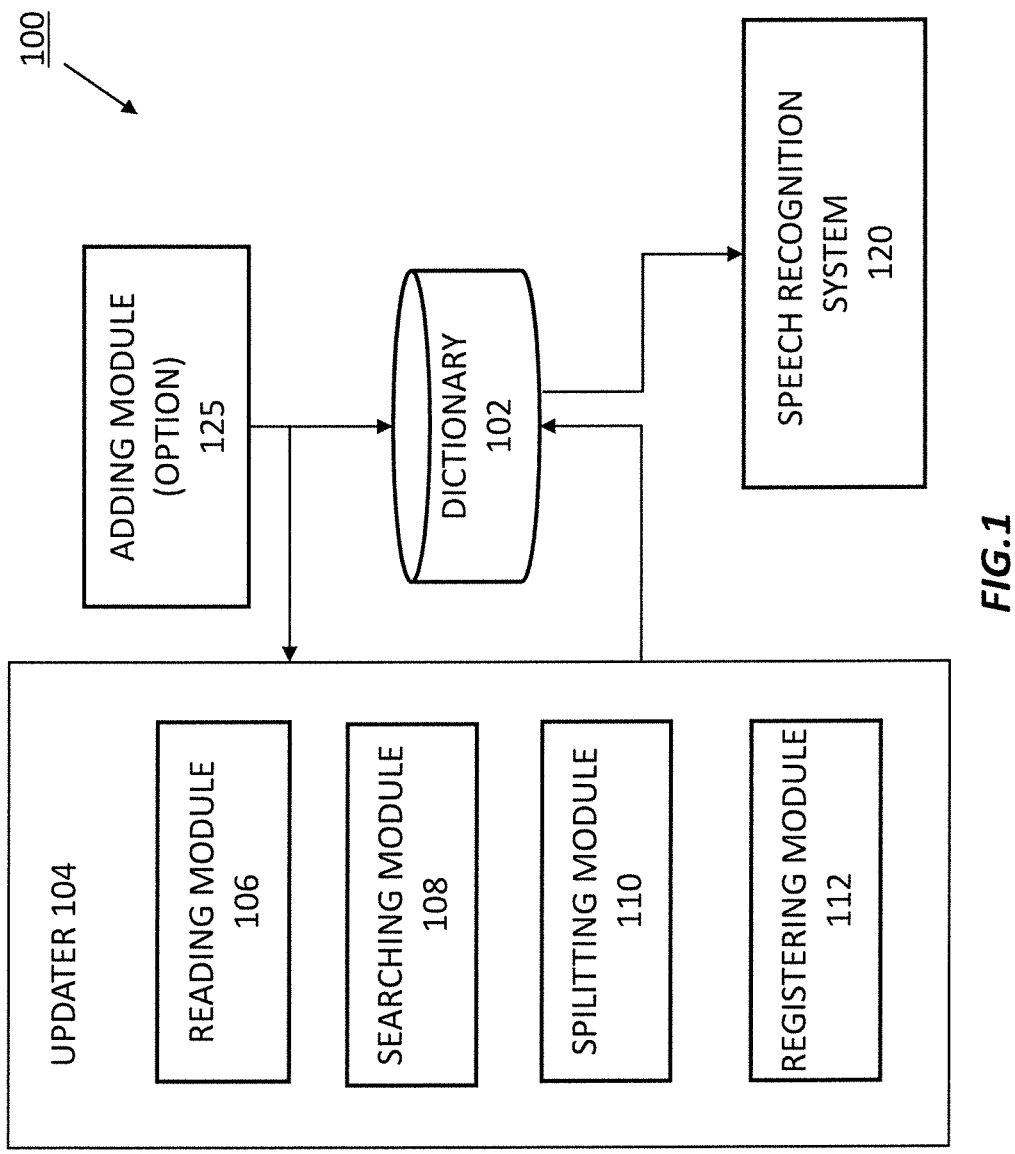
FIG. 1 illustrates a block diagram of a system that includes an updater of a dictionary according to an embodiment of the present invention.

Referring to FIG. 1, a block diagram of a system 100 according to an exemplary embodiment of the present invention is illustrated. As shown in FIG. 1, the system 100 may include a dictionary 102; an updater 104 that updates the dictionary 102 by splitting words in the dictionary 102; and a speech recognition system 120 that may use the updated dictionary 102 in order to improve the accuracy of speech recognition result.

The dictionary 102 may be any list which lists each word as a combination of surface string and its reading, as shown in FIG. 2. The dictionary 102 may contains long words including compound words such as store names and branch names. Each entry in the dictionary 102 may further have additional information.

The updater 104 can access the dictionary 102 and can update the dictionary 102 by splitting words in the dictionary 102. The updater 104 can include a reading module 106, a searching module 108, a splitting module 110 and a registering module 112.

The reading module 106 can be configured to read each word from the dictionary 102. There is no specific order of reading. The reading module 106 passes the read word as a source word to the searching module 108.

In one preferred embodiment, the reading module 106 may determine if the read word has a single surface string and a reading of a single character. In response to the negative determination, the reading module 106 passes the read word to the searching module 108. On the other hand, in response to the positive determination, the reading module 106 discards the read word without passing it to the searching module 108 and then access to the dictionary 102 to read another word to be processed from the dictionary 102.

The searching module 108 can be configured to receive the source word from the reading module 106 and to search the dictionary 102 for other words each having a substring with the same surface string and the same reading as the source word received from the reading module 106. If the searching module 108 finds one or more words each satisfying the conditions in the dictionary 102, then the searching module 108 passes the one or more words as target words together with the source word to the splitting module 110.

Referring to FIGS. 3A and 3B, a way of searching by the searching module 108 will be explained. Assuming that the reading module 106 reads a word of entry No. 1 from a dictionary depicted in FIG. 3A, the searching module 108 searches the dictionary for other words each having a substring with the same surface string and the same reading as the word of entry No. 1.

The searching module 108 finds the word of entry No. 2 and the word of entry No. 3 as a word having a substring with the same surface string as the word of entry No. 1, as shown in FIG. 3B. However, the substring of the word of entry No. 3, of which surface string matches with that of the word of entry No. 1, has its reading, "da-i-mi-ya", which is different from that of the word of entry No. 1, "o-o-mi-ya". As a result, the searching module 108 finds only the word of entry No. 2 as a word satisfying the all criteria.

Referring back to FIG. 1, the splitting module 110 can be configured to receive the one or more target words together with the source word from the searching module 108 and to split each of the target words by the source word to obtain one or more remaining substrings of each target word. The splitting module 110 passes the one or more remaining substrings of each target word to the registering module 112.

Referring to FIG. 3B, a way of splitting by the splitting module 110 will be explained. Assuming that the source word is a word of the entry No. 1 and the target word is a word of the entry No. 2, the splitting module 108 splits the word of entry No. 2 by the word of entry No. 1. More specifically, the splitting module 110 splits the surface string of the word of entry No. 2, "大宮与野", by the surface string of the word of entry No. 1, "大宮", and also splits the reading of the word of entry No. 2, "o-o-mi-ya-yo-no" by the reading of the word of entry No. 1, "o-o-mi-ya". As a result, the splitting module 110 obtains a combination of the surface string, "与野" and the reading, "yo-no" as a remaining substring of the word of entry No. 2.

In one preferred embodiment, for each target word, the splitting module 110 may determine if any one of the one or more remaining substrings has a single surface string and a reading of a single character.

In response to the negative determination, the splitting module 110 passes each target word and the one or more remaining substrings of the target word to the registering module 112. On the other hand, in response to the positive determination, the splitting module 110 discards the target word and the one or more remaining substrings of the target word.

In the aforesaid example in FIG. 3B, since the surface string, "与野" is not a single surface string and the reading, "yo-no" is not a reading of a single character, this remaining substring of the word of entry No. 2 is passed to the registering module 112.

Referring back to FIG. 1, the registering module 112 can be configured to receive each target word and the one or more remaining substrings of the target word from the splitting module 110. The registering module 112 can be configured to delete the target word from the dictionary 102 and adds each remaining substring of the target word as a new word to the dictionary 102. Please note that each remaining substring of the target word is obtained as a combination of the surface string and its reading, as described with reference to FIG. 3B.

Referring to FIGS. 3B and 4A, a way of registering by the registering module 112 will be explained. Assuming that the source word is a word of the entry No. 1, the target word is a word of the entry No. 2, and the remaining substring of the target word is a combination of the surface string, "与野" and the reading, "yo-no" (each shown in FIG. 3B), the registering module 112 deletes the word of the entry No. 2, "大宮与野/o-o-mi-ya-yo-no" and add the combination of the surface string, "与野" and the reading, "yo-no" as a new entry, instead of the word of the entry No. 2, as shown in FIG. 4A. The dictionary is updated from the state depicted in FIG. 3A to the state depicted in FIG. 4A.

For the dictionary in the state depicted in FIG. 4A, aforesaid series of operations by each module of the updater 104 is repeated. In the update from the state depicted in FIG. 4A to the sate depicted in FIG. 5A, the source word is the word of entry No. 2, "与野/yo-no", the target word to be deleted from the dictionary is the word of entry No. 4, "与野船橋/yo-no-fu-na-ba-shi", and its remaining substring to be added to the dictionary is "船橋/fu-na-ba-shi", as shown in FIG. 4B.

Also, in the update from the state depicted in FIG. 5A to the sate depicted in FIG. 6, the source word is the word of entry No. 4, "船橋/fu-na-ba-shi", the target word to be deleted from the dictionary is the word of entry No. 5, "船橋グリーンハイツ/fu-na-ba-shi-gu-ri:-n-ha-i-tsu", and its remaining substring to be added to the dictionary is "グリーンハイツ/gu-ri:-n-ha-i-tsu", as shown in FIG. 5B.

According to one or more embodiments of the present invention, the updater 104 may use a splitting criterion requiring not only a match of surface string but also a match of reading, thereby avoiding over splitting. And the accuracy of speech recognition referring the dictionary updated by the updater 104 may be improved.

Further, according to one or more embodiments of the present invention, the updater 104 may split a word in the dictionary 102 using other word in the same dictionary. This enables to split a word precisely even when the word contains, as a substring, one or more unknown words for the system 100.

Furthermore, according to one or more embodiments of the present invention, the updater 104 may register one or more remaining substrings in the dictionary which are obtained as a result of the splitting. This means that for the remaining substring being an unknown word for the system 100, the surface string and its reading are registered in the dictionary 102 without any additional information.

Referring back to FIG. 1, the system may include an adding module 125. The adding module 125 can be configured to add one or more prescribed words to the dictionary 102 prior to the reading by the reading module 106. The one or more prescribed words may be named entities, such as words in a biographical dictionary or words in a place name dictionary. These words make the possibility of splitting original words in the dictionary high. The dictionary 102 updated by the updater 104 may be used as a dictionary for a speech recognition system 120.

Figure 7:
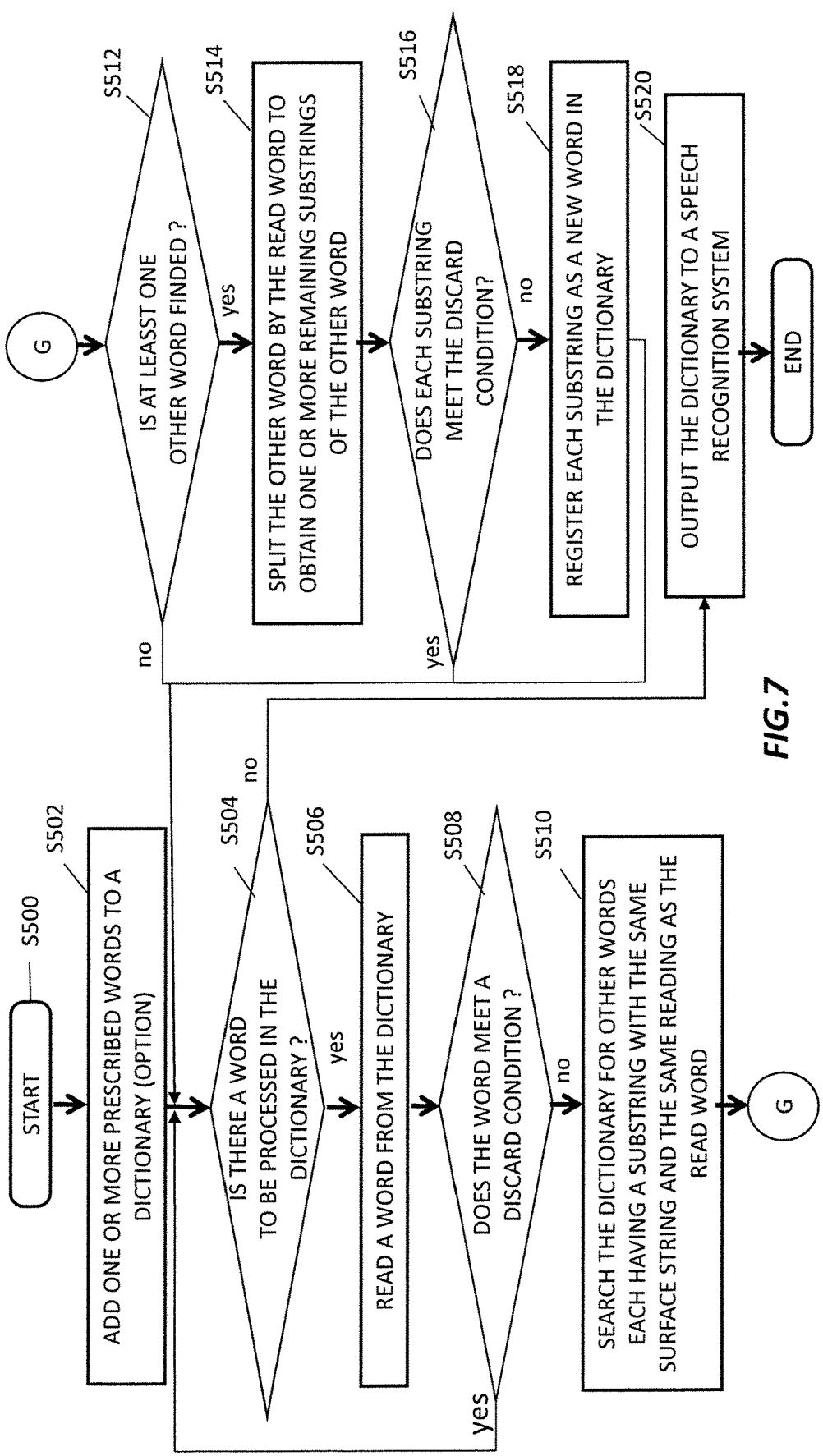
FIG. 7 is a flowchart depicting a novel separating process for words in a dictionary according to an embodiment of the present invention.

Referring to FIG. 7, a flowchart depicting a novel process for separating words in a dictionary according to an exemplary embodiment of the present invention is shown.

As shown in FIG. 7, process may begin at step S500 in response to receiving a request for initiating the process from an operator. Note that the process shown in FIG. 7 may be performed by a processing circuitry such as a processing unit that implements the system 100 or the updater 104 in FIG. 1, for the given dictionary 102 stored in a storage device operably coupled to the processing unit.

At step S502, the processing unit may add one or more prescribed words to the dictionary 102 as an option. The one or more prescribed words may be named entities, such as words in a biographical dictionary or words in a place name dictionary.

At step S504, the processing unit may determine whether there is a word to be processed in the dictionary 102 or not. In response to determining that there is a word to be processed in the dictionary 102 (S504: YES), the process transfers to the next step S506, and the processing unit reads a word from the dictionary 102.

At step S508, the processing unit may determine whether the word read at step S506 meets a discard condition or not. The discard condition requires that the word have a single surface string and a reading of a single character. In response to determining that the word has a single surface string and a reading of a single character (S508: YES), the process returns to step S504.

On the other hand, in response to determining that the word does not have a single surface string and a reading of a single character (S508: NO), the process transfers to the next step S510, and the processing unit may search the dictionary 102 for other words each having a substring with the same surface string and the same reading as the word read at step S506.

The process transfer from step S510 to step 512, the processing unit may determine whether there are at least one other words in the dictionary 102 matching requirements described in the step S510. In response to determining that there are not at least one other words in the dictionary 102 matching requirements described in the step S510 (S512: NO), the process returns to step S504.

On the other hand, in response to determining that there are at least one other words in the dictionary 102 matching requirements described in the step S510 (S512: YES), the process transfers to the next step S514 and for each other word, the processing unit may split the other word by the word read at step S506 to obtain one or more remaining substring of the other word.

At step S516, the processing unit may determine whether each remaining substring obtained at step S514 meets the discard condition described in relation to step S508 or not. In response to determining that each remaining substring obtained at step S514 meets the condition (S516: YES), the process returns to step S504.

On the other hand, in response to determining that each remaining substring obtained at step S514 does not meet the condition (S516: NO), the process transfers to next step S518, the processing unit may register each remaining substring obtained at step S514 as a new word in the dictionary 102. Then the process returns to step S504.

At step S504, when the processing unit determines that there is no word to be processed in the dictionary 102, then the process transfers to step S520. At step S520, The processing unit may output the dictionary 102 to a speech recognition system 120. Instead, the processing unit may send a message informing that the dictionary 102 has been updated to the speech recognition system 120. Then the process terminates.

Referring to FIG. 8, an example of program code according to one or more embodiments of the present invention is shown.

(1) A word list "L" consists of "N" words. Each word "w" of the list "L" consists of its surface string "c" and reading "p". And i, j=1, 2, . . . , N.

(2) If surface string c[i] of a word w[i] is a substring of c[j] of the word w[j] (j!=i) and reading p[i] of the word w[i] is a substring of p[j] of the word w[j], split c[j] by c[i] and p[j] by p[i].

(3) Separated surface string and reading are given as c[j]=c[x] c[i] c[y] and p[j]=p[x] p[i] p[y]. Obtain one or more combination of separated surface string and reading, w[x]=(c[x], p[x]), w[y]=p[y]).

(4) Add w[x] and w[y] to the list "L" for next iteration "L_next".

(5) This separation procedure is conducted for all words in the list "L". If now words added in the step (4), exit the iteration.

Two versions of program implementing the system and process shown in FIGS. 1 and 7 according to one or more embodiments were coded and executed for a given list of about 20 k words respectively. Each word in the given list consists of its surface string and reading. The difference between the two versions is an adding module 125 in FIG. 1.

Example 1: No Option

Example 2: Cities and Prefecture Name were Added to an Initial Dictionary

As for comparative examples, the following two examples are prepared.

Comparative Example 1: No Segmentation. Used Original Word in the List

Comparative Example 2: Separated into One or More Shorter Words Using Japanese Tokenizer Recall and precision of word separation is compared. The table below shows comparison between two comparative examples and our examples

|  | Recall | Precision | F-value |
|---|---|---|---|
| Comparative Example 1 | 59.1 | 100.0 | 74.3 |
| Comparative Example 2 | 98.6 | 83.1 | 90.2 |
| Example 1 | 82.1 | 98.8 | 89.6 |
| Example 2 | 88.1 | 98.4 | 93.0 |

As shown in the table, a set of shorter words can be obtained which consists of surface string and reading precisely. In contrast, the Japanese tokenizer can split into smaller words, but too many shorter words. Also, adding some words to the initial dictionary (Example 2) can improve performance.

Referring now to FIG. 9, a schematic of an example of a computer system 50, which can be used for the system 100, the updater 104, and the speech recognition system 120, is shown. The computer system 50 shown in FIG. 9 is implemented as computer system. The computer system 50 is only one example of a suitable processing device and is not intended to suggest any limitation as to the scope of use or functionality of embodiments of the invention described herein. Regardless, the computer system 50 is capable of being implemented and/or performing any of the functionality set forth hereinabove.

The computer system 50 is operational with numerous other general purpose or special purpose computing system environments or configurations. Examples of well-known computing systems, environments, and/or configurations that may be suitable for use with the computer system 50 include, but are not limited to, personal computer systems, server computer systems, thin clients, thick clients, or laptop devices, multiprocessor systems, microprocessor-based systems, programmable consumer electronics, network PCs, minicomputer systems, mainframe computer systems, and distributed cloud computing environments that include any of the above systems or devices, and the like.

The computer system 50 may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 9, the computer system 50 is shown in the form of a general-purpose computing device. The components of the computer system 50 may include, but are not limited to, a processor (or processing circuitry) 10 and a memory 14 coupled to the processor 10 by a bus 12 including a memory bus or memory controller, and a processor or local bus using any of a variety of bus architectures. The speech recognition based on the updated dictionary 102 improves the performance of the computer system 50 by reducing the number of clock cycles used to process a word to be recognized. This improvement of the computer system 50 can be seen as a faster response to the speech recognition command.

The computer system 50 typically includes a variety of computer system readable media. Such media may be any available media that is accessible by the computer system 50, and it includes both volatile and non-volatile media, removable and non-removable media.

The memory 14 can include computer system readable media in the form of volatile memory, such as random access memory (RAM). The computer system 50 may further include other removable/non-removable, volatile/non-volatile computer system storage media. By way of example only, the storage system 16 can be provided for reading from and writing to a non-removable, non-volatile magnetic media. As will be further depicted and described below, the storage system 16 may include at least one program product having a set (e.g., at least one) of program modules that are configured to carry out the functions of embodiments of the invention.

Program/utility, having a set (at least one) of program modules, may be stored in the storage system 16 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments of the invention as described herein.

The computer system 50 may also communicate with one or more peripherals 20 such as a keyboard, a pointing device, a car navigation system, an audio system, etc.; a display 22; one or more devices that enable a user to interact with the computer system 50; and/or any devices (e.g., network card, modem, etc.) that enable the computer system 50 to communicate with one or more other computing devices. Such communication can occur via Input/Output (I/O) interfaces 18. Still yet, the computer system 50 can communicate with one or more networks such as a local area network (LAN), a general wide area network (WAN), and/or a public network (e.g., the Internet) via the network adapter 24. As depicted, the network adapter 24 communicates with the other components of the computer system 50 via bus. It should be understood that although not shown, other hardware and/or software components could be used in conjunction with the computer system 50. Examples, include, but are not limited to: microcode, device drivers, redundant processing units, external disk drive arrays, RAID systems, tape drives, and data archival storage systems, etc.

The present invention may be a computer system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more aspects of the present invention has been presented for purposes of illustration and description, but is not intended to be exhaustive or limited to the invention in the form disclosed.

Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for separating a word in a dictionary, the method comprising:
   selecting a word from the dictionary as a source word;
   searching the dictionary for another word having a substring with a same surface string and a same sound as the source word;

splitting the another word by the source word to obtain one or more remaining substrings of the another word; and registering each of the one or more remaining substrings as a new word in the dictionary.

2. The computer-implemented method of claim 1, wherein the dictionary lists each word as a combination of a surface string and a sound.

3. The computer-implemented method of claim 1, wherein the sound, the searching, the splitting and the registering are repeated for each word in the dictionary.

4. The computer-implemented method of claim 1, further comprising determining if the source word has a single surface string and a sound of a single character and discarding the source word in response to a positive determination.

5. The computer-implemented method of claim 1, further comprising determining if any one of the one or more remaining substrings has a single surface string and a sound of a single character and discarding the one or more remaining substrings in response to a positive determination.

6. The computer-implemented method of claim 1, further comprising adding one or more prescribed words to the dictionary prior to the selecting.

7. The computer-implemented method of claim 6, wherein the one or more prescribed words are named entities.

8. The computer-implemented method of claim 1, further comprising performing speech recognition by referring the dictionary.

9. A computer system, the computer system comprising:
a memory storing the program instructions;
a processor in communications with the memory for executing the program instructions, wherein the processor is configured to:
select a word from a dictionary;
search the dictionary for another word having a substring with a same surface string and a same sound as the selected word;
split the another word by the selected word to obtain one or more remaining substrings of the another word; and
register each of the ore or more remaining substrings as a new word to the dictionary.

10. The computer system of claim 9, wherein the dictionary lists each word as a combination of a surface string and a sound.

11. The computer system of claim 9, wherein the processor is further configured to determine if the selected word has a single surface string and a sound of a single character and to discard the selected word in response to a positive determination.

12. The computer system of claim 9, wherein the processor is further configured to determine if any one of the one or more remaining substrings has a single surface string and a sound of a single character and to discard the one or more remaining substrings in response to a positive determination.

13. The computer system of claim 9, wherein the processor is further configured to add one or more prescribed words to the dictionary prior to selecting of a word from the dictionary.

14. The computer system of claim 13, wherein the one or more prescribed words are named entities.

15. The computer system of claim 9, wherein the processor is further configured to output the dictionary to a speech recognition system.

16. A computer program product for separating a word in a dictionary, the computer program product comprising a computer readable storage medium having program instructions embodied therewith, the program instructions executable by a computer to cause the computer to perform a method comprising:
selecting a word from the dictionary as a source word;
searching the dictionary for another word having a substring with a same surface string and a same sound as the source word;
splitting the another word by the source word to obtain one or more remaining substrings of the another word; and
registering each of the ore or more remaining substrings as a new word to the dictionary.

17. The computer program product of claim 16, wherein the dictionary lists each word as a combination of a surface string and a sound.

18. The computer program product of claim 16, wherein the method further comprises determining if the source word has a single surface string and a sound of a single character and discarding the source word in response to a positive determination.

19. The computer program product of claim 16, wherein the method further comprises determining if any one of the one or more remaining substrings has a single surface string and a sound of a single character and discarding the one or more remaining substrings in response to a positive determination.

20. The computer program product of claim 16, wherein the method further comprises adding one or more named entities to the dictionary before the selecting.

\* \* \* \* \*